United States Patent
Katoh et al.

[11] Patent Number: 5,739,617
[45] Date of Patent: Apr. 14, 1998

[54] ROTARY ELECTRIC MACHINE

[75] Inventors: Masahiro Katoh, Chiryu; Masami Niimi, Handa; Tsutomu Shiga, Nukata-gun, all of Japan

[73] Assignee: Nippondenso Co., Ltd., Kariya, Japan

[21] Appl. No.: 866,573

[22] Filed: Jun. 2, 1997

Related U.S. Application Data

[63] Continuation of Ser. No. 571,786, Dec. 13, 1995, abandoned.

[30] Foreign Application Priority Data

| Dec. 14, 1994 | [JP] | Japan | 6-310539 |
| Dec. 19, 1994 | [JP] | Japan | 6-315330 |
| Feb. 14, 1995 | [JP] | Japan | 7-025731 |
| May 26, 1995 | [JP] | Japan | 7-128645 |
| Sep. 19, 1995 | [JP] | Japan | 7-239901 |

[51] Int. Cl.$^6$ ............ H02K 3/04; H02K 3/16; H02K 3/34
[52] U.S. Cl. ............ 310/214; 310/201; 310/216; 310/217; 310/258; 310/259; 310/270
[58] Field of Search ............ 310/261, 214, 310/201, 270, 271, 216, 217, 258, 259

[56] References Cited

U.S. PATENT DOCUMENTS

| 1,028,985 | 6/1912 | Behrend | 310/262 |
| 1,224,518 | 5/1917 | Apple | 310/201 |
| 3,521,101 | 7/1970 | Arora | 310/233 |
| 3,988,625 | 10/1976 | Jager et al. | 310/260 |
| 4,126,799 | 11/1978 | Iogansen et al. | 310/260 |
| 4,808,873 | 2/1989 | Rowe et al. | 310/260 |
| 5,130,596 | 7/1992 | Umeki | 310/234 |
| 5,485,050 | 1/1996 | Zimmerman et al. | 310/260 |
| 5,508,577 | 4/1996 | Shiga et al. | 310/201 |

FOREIGN PATENT DOCUMENTS

| 2 534 085 | 4/1984 | France | 310/234 |

*Primary Examiner*—Steven L. Stephan
*Assistant Examiner*—Karl Eizo Tamai
*Attorney, Agent, or Firm*—Cushman, Darby & Cushman IP Group of Pillsbury Madison & Sutro, LLP

[57] ABSTRACT

An upper coil bar and lower coil bar are disposed in slots of an armature core. The upper coil bars have upper coil-end sections which extend radially from the outer periphery of the armature core and together from a commutator surface with which a brush member is in contact. The upper coil-end sections and coil-end sections of the lower coil bars are retained by a fixing cap fixed between a shaft of the rotary electric machine and the upper coil-end sections, and also by a spacer disposed between the upper coil-end sections and the lower coil-end sections so that the commutator surface can be maintained smooth even under conditions of thermal expansion or high-speed operation.

22 Claims, 13 Drawing Sheets

DIRECTION OF ROTATION

ROTARY ELECTRIC MACHINE

This is a continuation of application Ser. No. 08/571,786, filed on Dec. 13, 1995, now abandoned.

CROSS REFERENCE TO RELATED APPLICATION

The present application is based on and claims priority from Japanese Patent Applications Hei 6-310539 filed on Dec. 14, 1994, Hei 6-315330 filed on Dec. 19, 1994, Hei 7-25731 filed on Feb. 14, 1995, Hei 7-128645 filed on May 26, 1995, and Hei 7-239901 filed on Sep. 19, 1995, the contents of which are incorporated herein by reference.

BACKGROUND OF THE INVENTION

1. Field of the Invention

The present invention relates to an electric rotary machine suitable for high power and high speed operation, and more particularly relates to a starter for an internal combustion engine.

2. Description of Related Art

U.S. Pat. No. 5,130,596, which corresponds to Japanese Unexamined Patent Publication Hei 2-241346, discloses a rotary electric machine which has an upper coil of a single turn and a lower coil of a single turn in each slot of an armature core. The upper coils and lower coils inserted in the slots of the armature core are extended from the armature core to have a reduced outside diameter of the extended upper coils so as to form a cylindrical commutator held by resinous material, on which brushes are disposed in contact therewith.

However, since the commutator Of the above electric machine has to hold the extended upper and lower coils against centrifugal force and thermal stress, it is difficult to keep the commutating surface smooth when the machine is used as a high power machine or high speed machine.

SUMMARY OF THE INVENTION

The present invention is made in view of the above problems, and a primary object of the present invention is to provide a rotary electric machine which can be used as a high power and high speed machine.

Another object of the present invention is to provide a rotary electric machine which has smooth commutator structure of high heat dissipation and of high mechanical strength against centrifugal force and thermal expansion.

Another object of the present invention is to provide a rotary machine which includes a plurality of radially disposed lower coil-end sections, a plurality of radially disposed upper coil-end sections with which a brush member is disposed in contact and means for restricting axial movement of the upper coil-end sections.

Another object of the present invention is to provide a rotary electric machine which includes the restricting means having a member to allow coil sections to expand thermally in a direction opposite the commutator surfaces.

Another object of the present invention is to provide a rotary electric machine which includes the restricting means having a member engaged with the coil-end sections at one end thereof.

Another object of the present invention is to provide a rotary electric machine in which the restricting means has a spacer disposed between the upper coil-end sections and the lower coil-end sections.

Another object of the present invention is to provide a rotary electric machine in which each of the coil sections has projections and the spacer has recesses so that each of the projections is fitted into a corresponding one of the recesses.

A further object of the present invention is to provide a rotary electric machine in which the restricting means includes a fixing portion secured to the shaft of the rotary electric machine, a portion biasing the upper coil-end sections and an elastic portion connecting the fixing portion and the biasing portion.

BRIEF DESCRIPTION OF THE DRAWINGS

Other objects, features and characteristics of the resent invention as well as the functions of related parts of the present invention will become clear from a study of the following detailed description, the appended claims and the drawings. In the drawings:

DETAILED DESCRIPTION OF THE PREFERRED EMBODIMENTS

Preferred embodiment will be described with reference to appended drawings hereafter.

(First Embodiment)

A rotary electric machine according to a first embodiment is described with reference to FIGS. 1 through 13 and FIG. 16.

Figure 1:
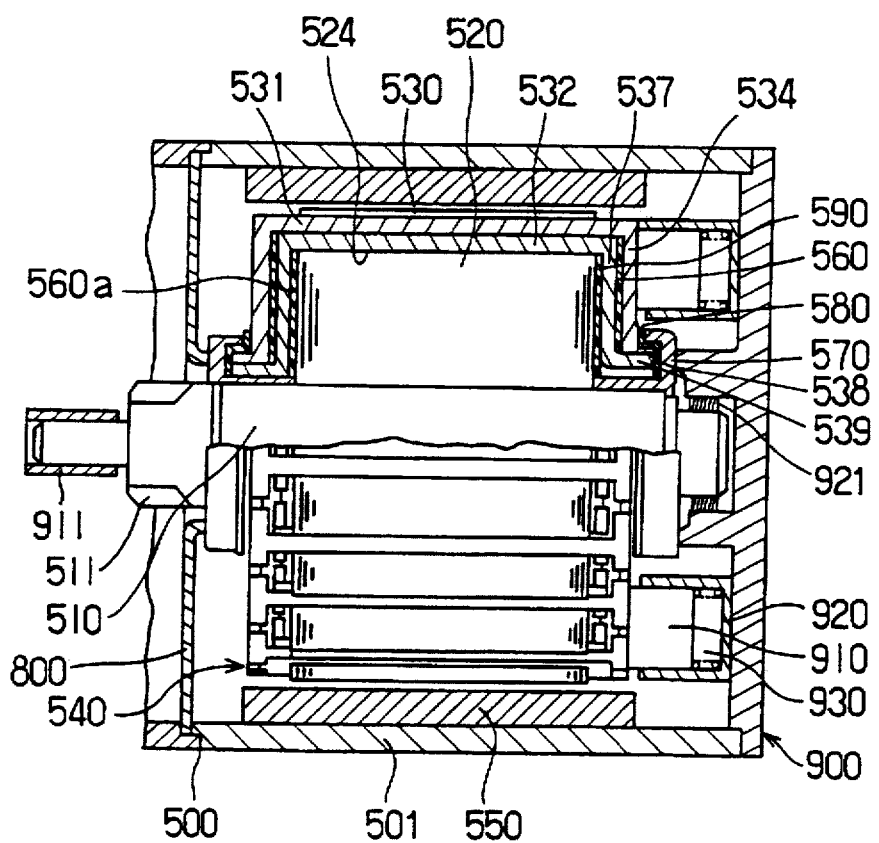
FIG. 1 is a cross-sectional side view illustrating a rotary electric machine according to a first embodiment of the present invention.
Figure 2:
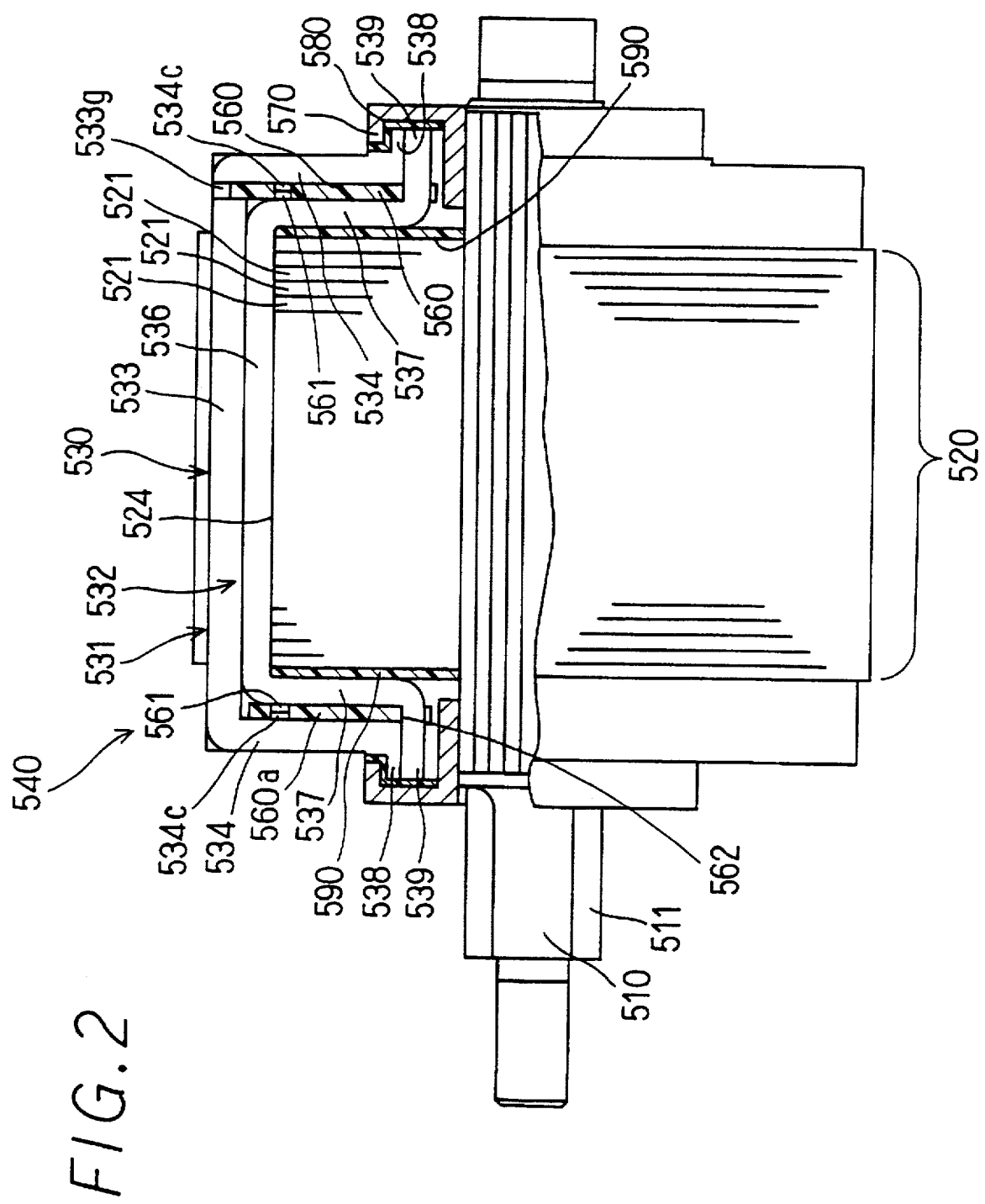
FIG. 2 is a cross-sectional side view illustrating an armature according to the first embodiment.

The rotary electric machine 500 has a shaft 510, an armature core 520 carried by the shaft 510, a yoke 501 and a stationary magnetic poles 550 secured to the yoke 501, as illustrated in FIG. 1 and FIG. 2.

The shaft 510 is supported rotatably by a metal bearing 911 which is disposed in an external member (not shown) and a metal bearing 921 which is press-fitted into an inner periphery of an end frame 900. A front end of the shaft 510 has a gear which is engaged with a gear of a planetary gear unit of a starter motor(not shown).

Figure 3:
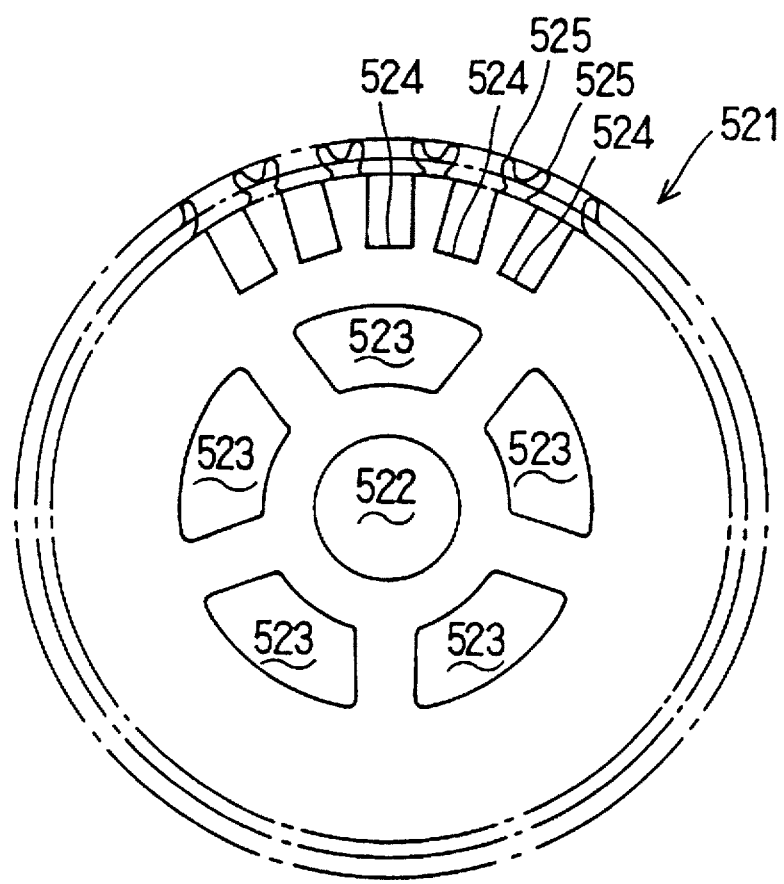
FIG. 3 is a schematic plan view illustrating the armature core plate according to the first embodiment.

The armature core 520 is composed of a plurality of stacked ring-shaped core plates 521 having center opening 522, to which the shaft 510 is press-fitted. The core plates 521 are produced from a thin steel sheet by punch pressing. A plurality of openings 523 are formed at central portions of the core plate 521 around the center opening 522 to reduce weight. A plurality of slots 524 (25 slots for instance) are formed along the outer periphery of the core plates to accommodate an armature coil 530. A plurality of Y-shaped tooth tips 525 are formed on both sides of teeth which are formed between the slots as shown in FIG. 3. They are bent to hold the armature coils 530 in the slots and to introduce field magnetic flux.

Figure 12:
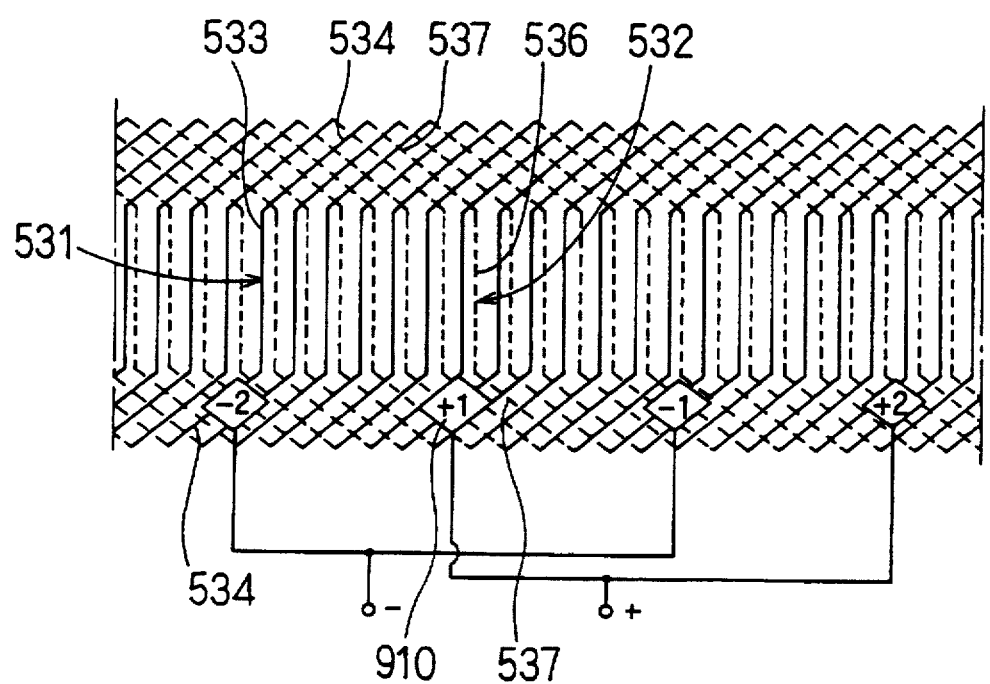
FIG. 12 is a winding chart of the armature according to the present invention.

The armature coil 530 is composed of a plurality of upper coil bars (for instance, 25 coil bars) 531 and the same number of the lower coil bars 532. The upper coil bars 531 and the lower coil bar 532s are stacked in the radial direction to form a double-layer coil type and are connected at one end to other lower coil bars and upper coil bars in different slots respectively to form a single-turn coil. FIG. 12 illustrates an example of winding of the armature coil 530 and a reference numeral 910 indicates one of the brushes in contact with the upper coil-end portions 534 which are described later.

Figure 6:
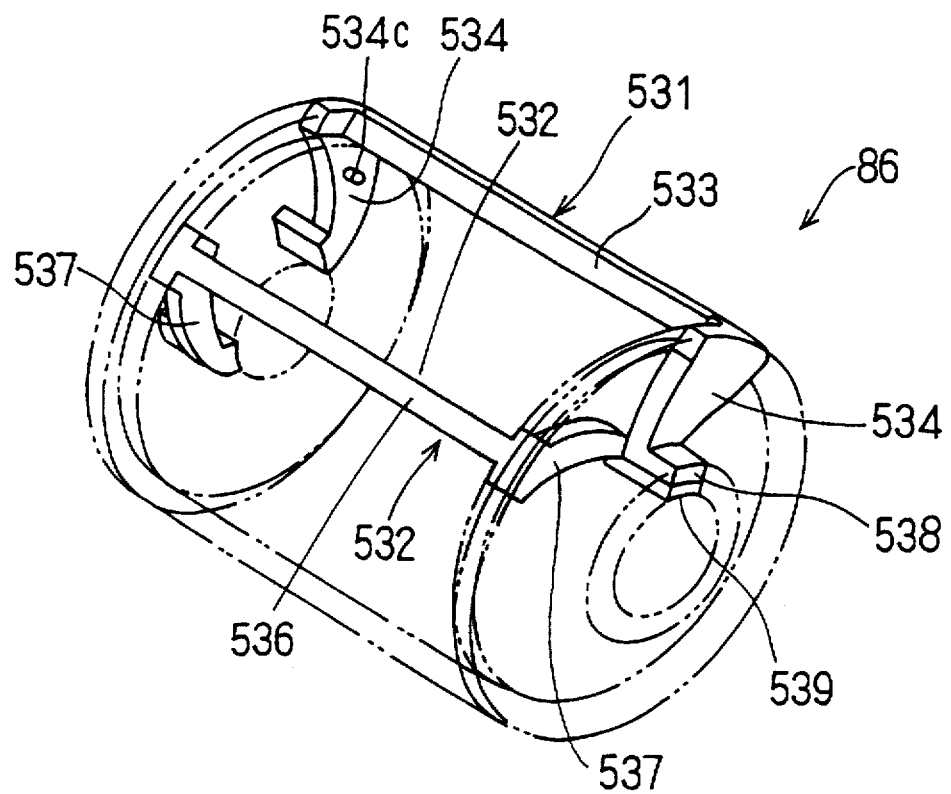
FIG. 6 is a schematic perspective-view illustrating the upper coil bar and the lower coil bar disposed in position.

The upper coil bar 531 is made of copper or other conductive material and is composed of an upper coil section 533 which extends in the slot 524 in front of the stationary magnetic pole 550 and a pair of end sections 534 which extend radially inward from both ends of the upper coil section 533, as shown in FIG. 6.

Figure 7:
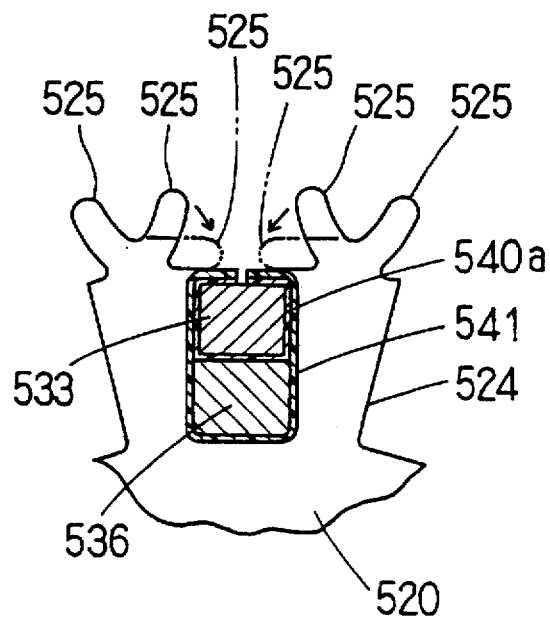
FIG. 7 is a cross sectional plan view of the upper coil bar and the lower coil bar disposed in a slot according to the first embodiment.

The upper coil section 533 is a bar-like member which has a rectangular cross section and is covered with an insulating film sheet 540a such as nylon thin film or paper, and is held in the slot securely with a lower coil section 536 (to be described later) as shown in FIG. 7.

Figure 5:
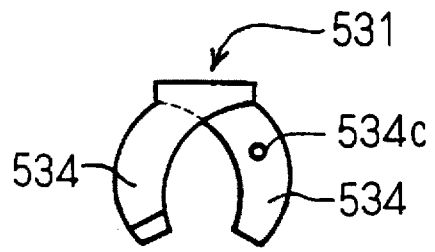
FIG. 5 is a plan view illustrating the upper coil bar viewed from the front of the armature according to the first embodiment.
Figure 8:
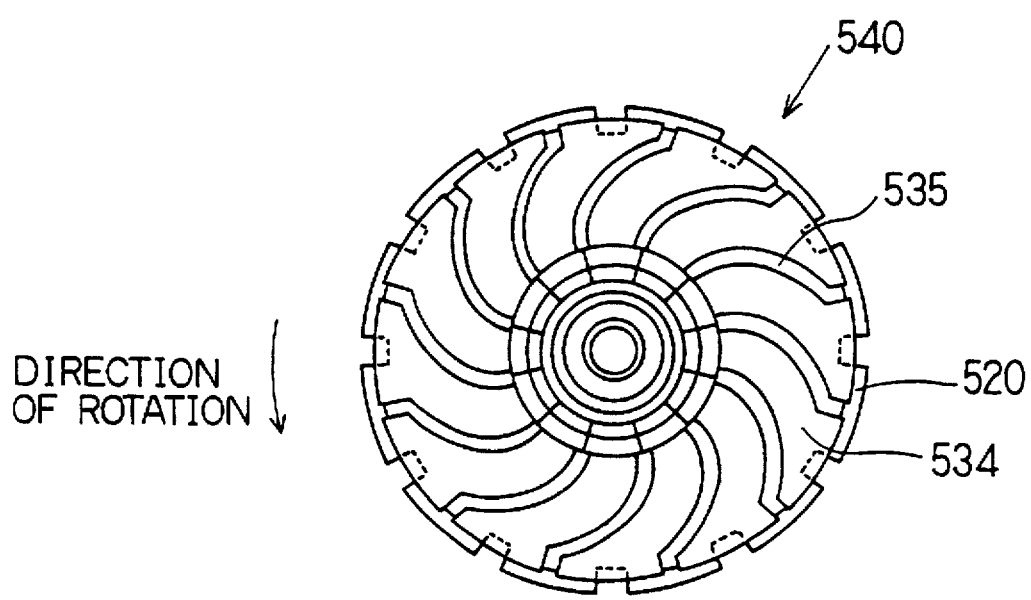
FIG. 8 is a schematic plan view illustrating the armature according to the first embodiment.

The pair of end sections 534 of the upper coil bar 531 are symmetrical in the shape. One of the pair of end sections is inclined in a rotating direction as schematically shown in FIG. 8, and the other is inclined in the opposite direction as shown in FIG. 5. The inclined angle of the pair of the end sections relative to the radial direction is the same as that relative to the upper section 533. One of the end section 534 disposed at a side of the end frame 900 composes a commutator segment in contact with brushes 910 to be described later and, therefore, the surface in contact with the brushes 910 is made smooth.

The upper coil-end sections 534 are disposed radially in parallel with each other in a circular plane vertical to the shaft 510 to form parallel grooves 535 between the coil-end sections 534 and, therefore, they become wider as they go out from the center as schematically shown in FIG. 8. As a result, the contact surface of the coil ends with the brushes can be provided much broader than that of the conventional rotary electric machine so that heat generated by the brushes can dissipate more effectively.

When the armature rotates, wind generated by the grooves 535 flows from the central portion toward radially outer portion of the upper coil-end sections 534. As a result, the heat generated by friction of the brush 910 and the upper coil-end sections 534 is dissipated and the resultant powder of the brush can be discharged sufficiently.

Figure 4:
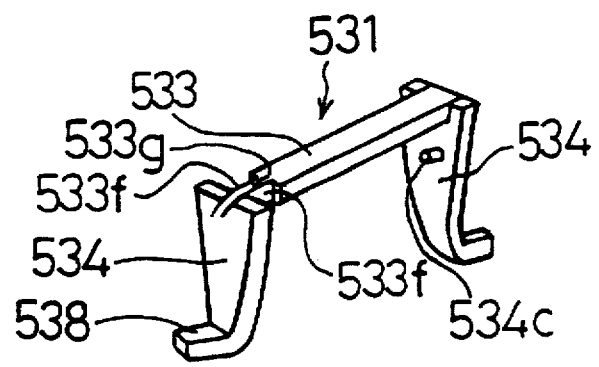
FIG. 4 is a perspective view illustrating an upper coil bar according to the first embodiment.
Figure 9:
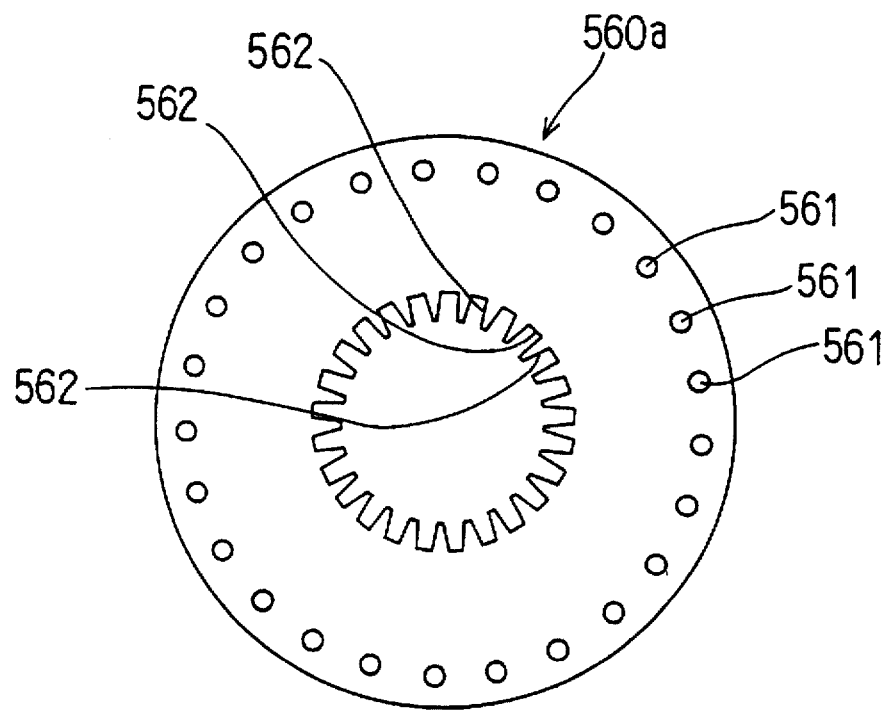
FIG. 9 is a plan view illustrating an insulating spacer disposed at a side of the armature opposite brushes according to the first embodiment.
Figure 13:
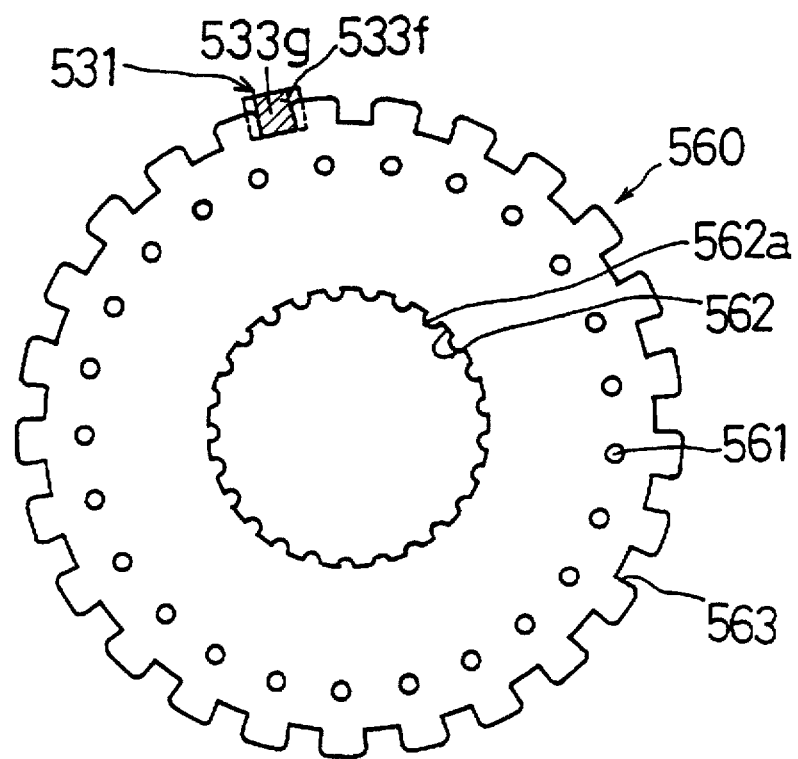
FIG. 13 is a plan view illustrating an insulating spacer disposed at the brush side of the armature according to the first embodiment.
Figure 14:
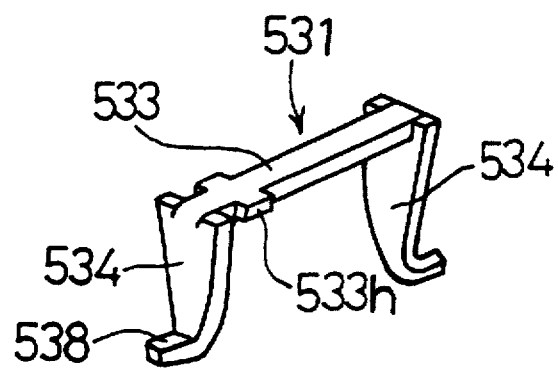
FIG. 14 is a perspective view illustrating a variation of the upper coil bar according to the first embodiment.

The upper coil-end section 534 has a small projection 534c which is disposed at a radially outer portion thereof between the upper coil-end section 534 and a lower coil-end section 537 as shown in FIG. 2, FIG. 4 and FIG. 6 to retain an insulating spacer 560 or 560a by engagement with an opening 561 formed in the spacer for positioning shown in FIG. 9 and FIG. 13.

A narrow bar portion 533g and grooves 533f on the opposite sides are formed in the upper coil section 533 near the brush-side upper coil-end section 534 as shown in FIG. 4.

The lower coil bar 532 is made of copper or other conductive material and composed of a lower coil section 536 which extends in the slot 524 and a pair of the end sections 537 which extend radially inward from both ends of the lower coil section 536. The lower coil bar 532 does not have a narrow bar portion 533g or grooves 533f.

The upper coil-end sections 534 and the lower coil-end sections 537 are insulated by the spacers 560 shown in FIG. 13 and the lower coil-end sections 537 and the armature core 520 are insulated by an insulating ring 590 made of resinous material such as nylon or phenolic resin as shown in FIG. 1.

The lower coil section 536 is a bar-like member which has a rectangular cross section and is covered with an insulating film sheet 541 such as nylon thin film or paper, and held in the slot securely with the upper coil section 533 as shown in FIG. 6 and FIG. 7.

The lower coil-end sections 537 are disposed to incline in a direction opposite that of the upper coil-end sections 534. The angle of inclination the pair of the lower end sections 537 relative to the radial direction is the same as that relative to the lower coil section 536.

Radially inner ends of the lower coil-end sections 537 have lower internal extensions 539 at opposite sides as shown in FIG. 2. Each of the lower internal extensions 539 is inserted into a corresponding recess formed in the central opening of the insulating spacers 560 or 560a under each corresponding extension 538 (to be described later) of the upper coil-end sections 534 as shown in FIG. 9 and FIG. 13. The lower internal extensions 539 are spaced from and insulated from the shaft.

Figure 10:
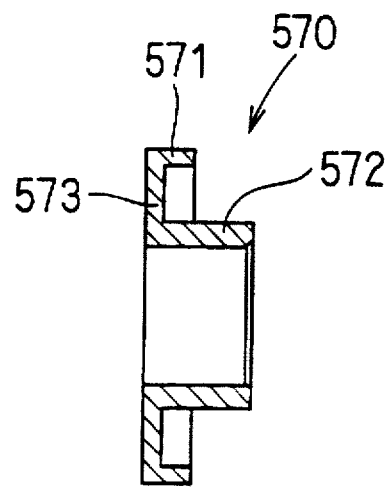
FIG. 10 is a cross-sectional side view illustrating a fixing cap.
Figure 11:
FIG. 11 is a cross-sectional side view illustrating an insulation cap.

Radially inner ends of the upper coil-end section 534 have upper internal extensions 538 at the opposite sides as shown in FIG. 2. Each of the upper internal extensions 538 is placed on a corresponding extension 539 of the lower coil-end sections 537 and bonded thereto by way of welding or a mechanical element. As a result, the upper and lower internal extensions 538 and 539 of both sides of the upper and lower coil sections 533 and 536 compose rings as shown in FIG. 8. A pair of fixing caps 570, each of which has an outer ring 571 for retaining the extensions and an inner ring 572 for receiving the shaft as shown in FIG. 10, are press-fitted to the shaft and hold the outer peripheries of the ring shaping upper internal extensions 538 via insulating caps 580 shown in FIG. 11, as shown in FIG. 1.

The insulating spacers 560 for the brush side of the armature and 560a for the opposite side thereof are thin rings made of resinous material such as epoxy resin, phenolic resin or nylon, and have a plurality of openings 561 to be engaged with the projections 534c of the upper coil-end sections 534 as shown in FIG. 9 and FIG. 13. The insulating spacer 560 has a toothed central opening which has recesses 562 accommodating the lower internal extensions of 539 and teeth 562a. The openings 561, the recesses 562 and the teeth 562a are used for positioning of the armature coil 530. The insulating spacer 560 has teeth 563 on the outer periphery thereof, which are engaged with the narrow bar portions 533g.

The openings 561 can be made when the upper coil-end section 534 is punched from the outside against the insulating spacer 560 to form the projections 534c. In this case, the upper coil-end section is hardened due to the plastic deformation so that the abrasion caused by contact with the brush 910 can be reduced.

The fixing cap 570 is a steel ring, which has the outer ring 571 and the inner ring 572 (as described before) and a retaining ring 573 which prevents the upper coil-end sections 534 from shifting axially. The outer ring 571 prevents the armature coil from expanding because of the centrifugal force.

The fixing cap 570 disposed in front of the armature 540 in abutment with a front plate 800 prevents the armature 540 from moving in the axial direction with the fixing cap 570 disposed in the rear of the armature 540 in abutment with the end frame 900. Thus, no additional retaining member for the armature is necessary.

In summary, the upper coil bars 531 and the lower coil bars 532 are retained in the slots 524 by the tooth tips 525 as shown in FIG. 7 and secured in position by the openings 561 and recesses 562 of the insulating spacers 560 and 560a shown in FIG. 9 and FIG. 13, and also by the fixing caps 570 shown in FIG. 10.

The upper coil sections 533 and the lower coil sections 536 are disposed in the slots 524 of the armature core 520, and the tooth tips 525 are bent down as indicated by arrows shown in FIG. 7 so that the upper coil sections 533 and the lower coil sections 536 are prevented from projecting from the slots 524. The upper coil section 533 is covered with both lower insulating film sheet 540a and upper insulating film sheet 541 so that the insulation of the upper coil section 533 may be protected even if the tooth tip 525 presses the upper coil section hard.

Each of the lower internal extensions 539 of the lower coil-end sections 537 is fitted to each of the recesses 562 of the insulating spacer 560 so that the lower coil end sections are disposed in position and retained against the centrifugal force. Each-of the openings 561 of the insulating spacer 560 receives a small projections 534c to position the upper coil-end sections 534 and prevents them from expanding due to the centrifugal force.

The fixing cap 570 holds the upper internal extensions 538 and the lower internal extensions 539 from the outside so that inner portions of the armature coil 530 can be prevented from expanding. The fixing cap 570 also restricts axial movement of the upper internal extensions 538 and the lower internal extensions 539 so that additional space for allowing the axial movement is not required and the axial length of the starter can be reduced.

Each of the narrow bar portions 533g formed on the brush side of the upper coil sections 533 engages each of the teeth 563 on the outer periphery of the insulating spacer 560. The width of the narrow portion 533 is approximately the same as the thickness of the insulating spacer 560. Thus, the axial movement of the brush-side upper coil sections 534 is controlled to maintain the commutating surface formed by the brush-side upper coil-end sections 534 smooth even if the upper coil sections 533 thermally expand, so that good commutation can be ensured.

Figure 16:
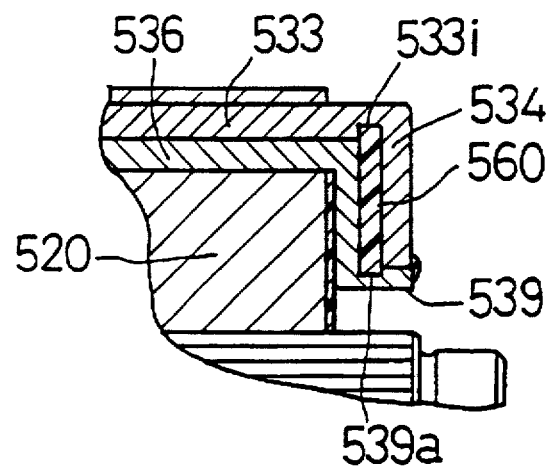
FIG. 16 is a cross-sectional side view illustrating a coil end portion of an armature according to a third embodiment.

In order to further ensure good commutation, the lower internal extensions 539 have grooves 539a on their cylindrical upper surfaces as shown in FIG. 16. The width of the groove 539a is approximately equal to the thickness of the insulating spacer 560. The teeth 562a formed on the toothed central opening of the insulating spacer 560 are fitted into the grooves 539a. As a result, axial and circumferential movement of the lower coil-end sections 537 and the upper coil-end sections 534 welded together can be restricted even if the armature coil is heated or subjected to high temperature.

Since the upper coil-end sections and the lower coil-end sections are connected in a unit at their internal extensions 538 and 539 via the insulating spacer 560, accuracy and mechanical strength including strength against the centrifugal force can be ensured, and also a good heat path from the upper coil-end sections 534, through the insulating spacers 560 and 560a and the lower coil-end sections 537, to the armature core 520 can be formed without using a complicated structure.

When the armature is assembled, the shaft 510 is press-fitted into the armature core 520 having a plurality of the stacked core plates 521, and the insulating rings 590 are disposed on both sides of the armature core.

Then, the lower coil sections 536 of the lower coil bars 532 are inserted into the slots 524 with the insulating film sheet 541 and the insulating spacer 560 is put on the outer surfaces of the lower coil-end sections 537 so that the lower extensions 539 are respectively fitted to the recesses 562 of the central opening of the insulating spacer 560. Thus, the positioning of the lower coil bars is finished.

Thereafter, the upper coil sections 533 are inserted into the slots 524 with the upper insulating film sheets 540 respectively, and the projections 534c of the upper coil-end sections 534 are fitted into the openings 561 respectively. Thus, the positioning of the upper coil bars is finished. The upper internal extensions 538 and the lower internal extensions 539 are subsequently bonded together by welding or the like.

Then, the tooth tips 525 are bent down to hold the upper and lower coil sections 533 and 536 in the slots 524 and the fixing caps 570 are press-fitted to the shaft 510 from both ends thereof to cover and hold the upper internal extensions 538 of the armature coil 530. Thus, the armature coil 540 is assembled.

The stationary magnetic poles 550 include permanent magnets which are directly secured to the yoke 501. The permanent magnets can be replaced with field coils energized by a battery or a generator in a well-known manner.

Brush holders 920 are secured to the end frame 900 which is secured to one end of the yoke 501. They accommodate the brushes 910 slidably in the axial direction and springs 930 which bias the brushes against the upper coil-end sections 534.

(Variations of the First Embodiment)

Through holes can be formed in the yoke 501 so that the brush powder caused by the brush wear can be discharged with cooling wind generated by the centrifugal fan function of the armature, thereby ensuring insulation of the armature coil 540.

Narrow bar portions 533g formed in the upper coil sections 533 can be replaced with projections 533h formed on both sides of thereof by punching or the like. In this case, the outer recess 563 is fitted between the upper coil-end section 534 and the projection 533h.

Resinous binder can be filled into the space between the insulating spacer 560 and the upper coil-end sections 534 after the insulation spacer 560 is put between the lower coil-end sections 537 and the upper coil-end sections 534 so as to secure the upper coil-end sections to the insulating spacer 560. The insulating spacer 560 can be molded with resinous material after the lower coil-end sections 537 and the upper coil-end sections 534 are assembled. The resinous binder can be put only in a space around the upper coil-end section 534. Since the movement of the coil is allowed in the direction opposite the brush, the surface of the upper coil-end section can be kept more smooth.

Even a conductive plate can be used in place of the insulating plate 534 if the lower and upper coil-end sections are coated with insulating material. In this case, the conductive plate functions to hold the armature coil in place as described before.

The narrow bar portions 533g can be omitted when the fixing cap 570 retains the upper coil-end sections in position securely.

The fixing cap 570 can be made of resilient material such as spring steel. If the upper coil-end sections 534 expand thermally, the shift is absorbed by the resiliency of the fixing cap 570 and the smooth surfaces of the commutating portions of the upper coil-end sections 534 are ensured without the cap's shifting on the shaft 510.

(Second Embodiment)

Figure 15:
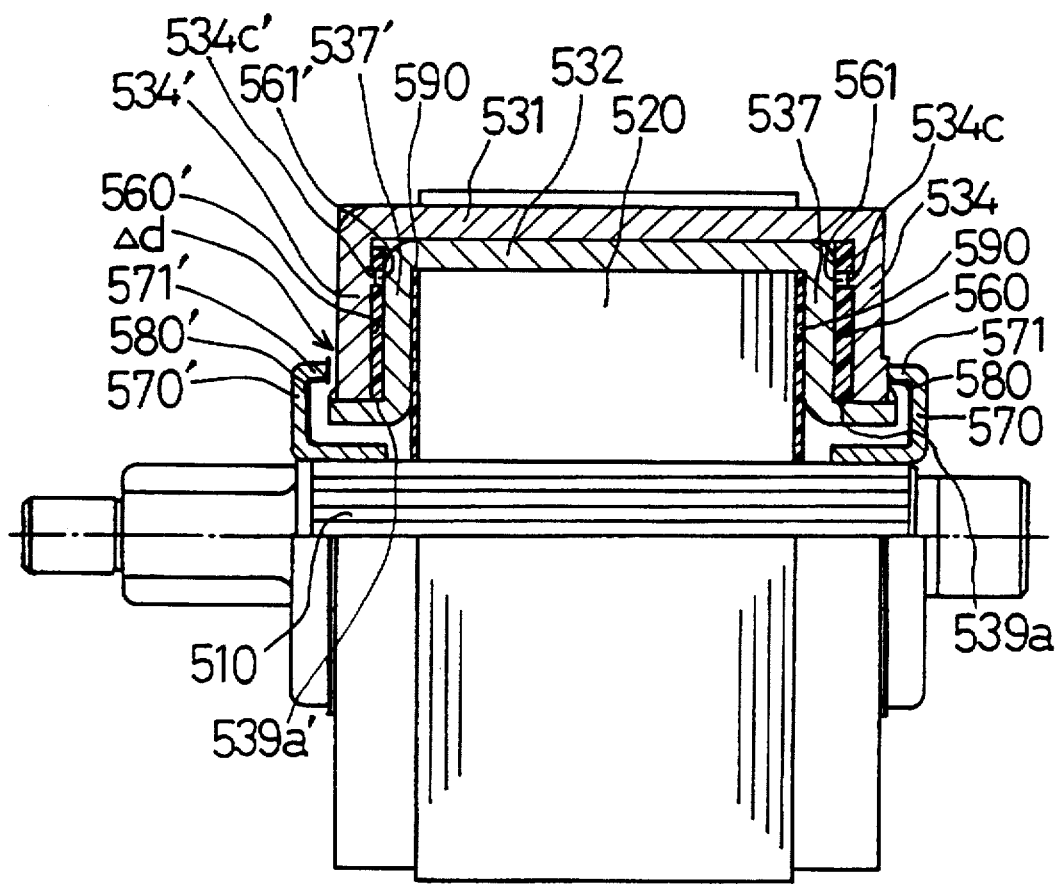
FIG. 15 is a cross-sectional side view illustrating an armature according to a second embodiment.

A rotary electric machine according to a second embodiment is described with reference to FIG. 15. Reference numerals which are the same as those used in the description related to the first embodiment indicate the same or substantially the same parts or portions. Therefore, only different parts and portions of different embodiments are described hereinafter.

In order to distinguish the brush side members from the other side members in this embodiment, a prime mark (') is put on the corresponding parts or portions of the other side (hereinafter referred to as second) members.

Fixing caps 570 and 570' are press-fitted to a shaft 510 from the outside to retain the upper coil-end sections 534 and 534' and the lower coil-end sections 537 and 537' in position in the same manner as the first embodiment.

However, a second insulating cap 580' is bonded to the armature-side surface of the fixing cap 570' by adhesive material. The second insulating cap 580' has an outer ring portion (which is the same as in the first embodiment) which faces the second upper coil-end sections 534' at a small axial gap Δd. The axial gap Δd allows the thermal expansion of the upper and lower coil sections so that the commutation surface formed by the brush-side upper coil-end sections can be kept smooth even if the temperature of the upper coil-end sections 534 and the upper coil sections 534 becomes high.

The second upper coil-end 534' has small projections 534c', which are also substantially the same as those of the first embodiment; however, they are longer than the gap Δd so that they cannot get out of openings 561' (the same as those of the first embodiment) of the second insulating spacer 560' even if the thermal expansion is significant.

The fixing caps 570 and 570' can be secured to the armature core directly. In this case, the gap Δd should be made longer than difference of the thermal expansion between the armature core 520 and the upper and lower coil sections 533 and 536.

The small projections can be formed on the upper coil-end sections 534 and 534' to be engaged with openings which are formed in the insulating spacers 560 and 560'. The insulating spacer 560 and 560' can be made from materials other than insulating material. For instance, metal plates covered with insulation coating can be used.

(Third Embodiment)

A rotary electric machine according to a third embodiment of the present invention is described with reference to FIG. 16. In this embodiment, grooves 533i are formed on the inner peripheries of the upper coil sections 533 to accommodate the peripheral portions of the insulating spacer 560 along with grooves formed on the lower internal extensions 536 in the same manner as described with regard to the first embodiment.

Accordingly, the commutation surface of the upper coil-end sections can be maintained smooth.

(Fourth Embodiment)

Figure 17:
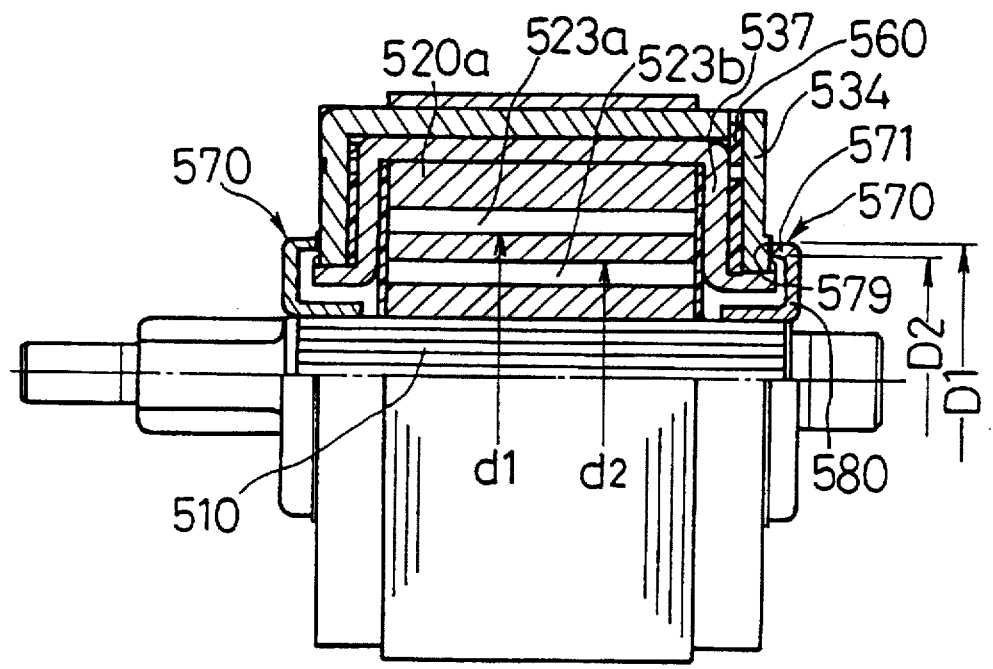
FIG. 17 is a cross-sectional side view illustrating an armature according to a fourth embodiment.
Figure 18:
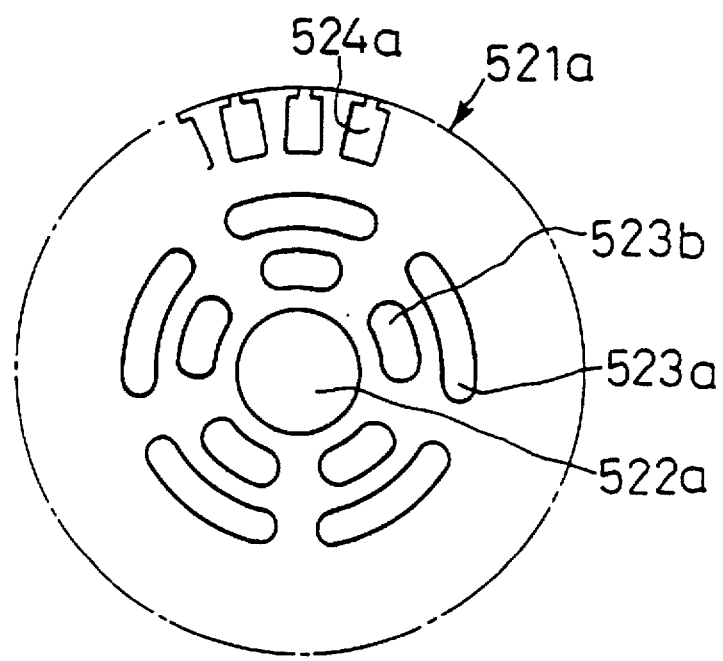
FIG. 18 is a schematic plan view illustrating the armature core plate according to the fourth embodiment.

A rotary electric machine according to a fourth embodiment of the present invention is described with reference to FIG. 17 and FIG. 18. The machine according to this embodiment is almost the same except for an armature core 520a.

The armature core 520a has through holes 523a and 523b which are different from those of the first embodiment. That is, the through holes 523a are disposed in a circular zone in the armature core 520a having inside diameter d1 which is greater than the outside diameter D1 of the outer ring 571 of the fixing cap 570, and the through holes 523b are disposed in a circular zone having outside diameter d2 which is smaller than the inside diameter of the outer ring 571 of the fixing cap 570 as shown in FIG. 17. The inside diameter d1 is the shortest distance between the through holes 523a, that is, between the innermost portions of the through holes 523a and the outside diameter is the longest distance between through holes 523b, that is, between the outermost portions of the through holes 523b.

Thus, the end surface of the outer ring 571 presses against the portion between the above two zones so that the upper coil-end sections may not bend, thereby keeping the commutating surface of the upper coil-end sections smooth.

Even if the upper coil-end sections 534 expands thermally, the upper coil-end sections are prevented from bending into the through holes.

(Fifth Embodiment)

Figure 19:
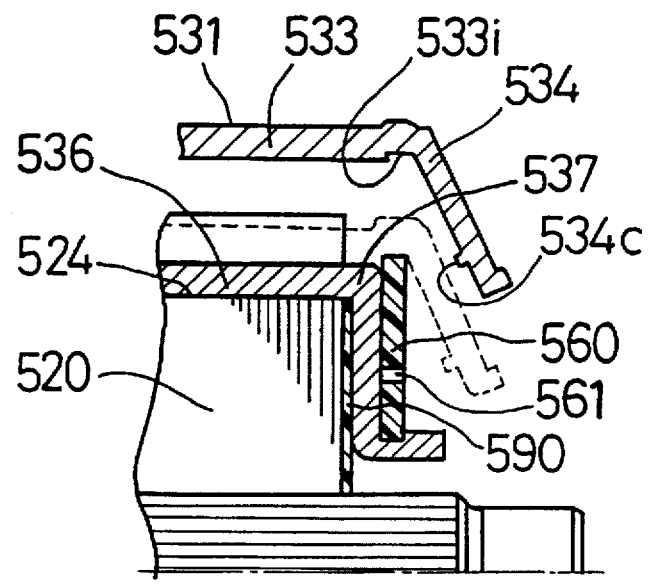
FIG. 19 is a cross-sectional side view illustrating final bending of an upper coil bar according to a fifth embodiment.
Figure 20:
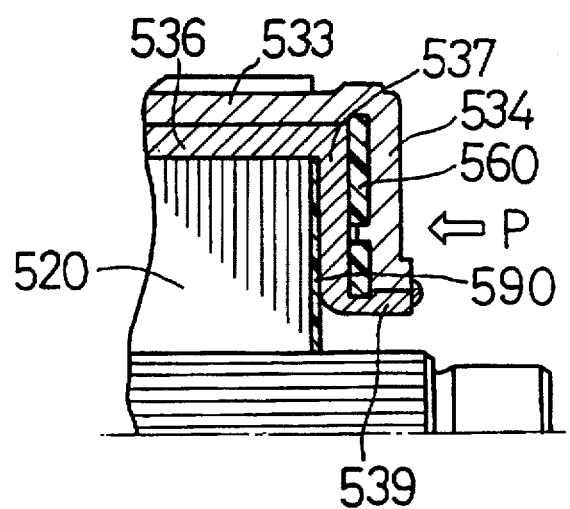
FIG. 20 is a cross-sectional side view illustrating the upper coil bar after the final bending according to the fifth embodiment.

A rotary electric machine according to a fifth embodiment of the present invention is described with reference to FIG. 19 and FIG. 20. In this embodiment, the upper coil sections 533 are not completely bent before they are inserted into the slots 524 as shown in FIG. 19. The upper coil sections 533 have the same grooves 533i as those of the third embodiment to which the outer peripheral portion of the insulating spacer 560 is fitted; however, the grooves 533i are formed by punching in this embodiment. The outer diameter of the insulating spacer 560 is made larger than the outer diameter of the lower coil sections 536.

The upper coil-end sections 534 are bent and the projections 534c are inserted into the openings 561 of the insulating spacer 560. Finally, the lower internal extensions 539 and the upper coil-end sections are welded to finish the armature coil 530.

Figure 21:
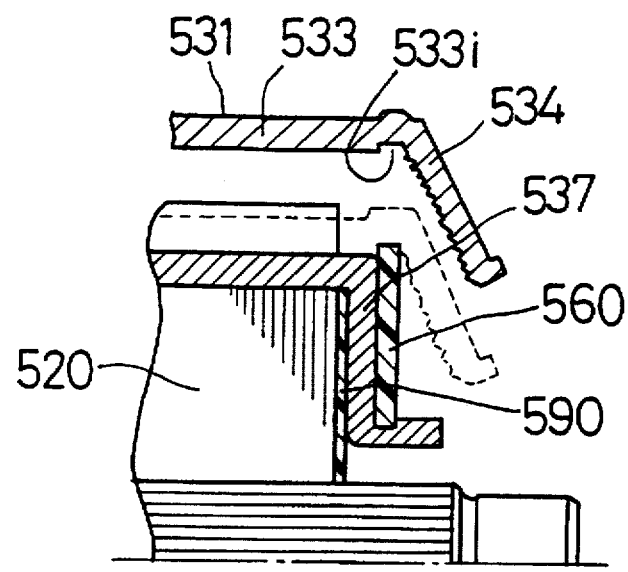
FIG. 21 is a cross-sectional side view illustrating final bending of an upper coil bar according to a variation of the fifth embodiment.
Figure 22:
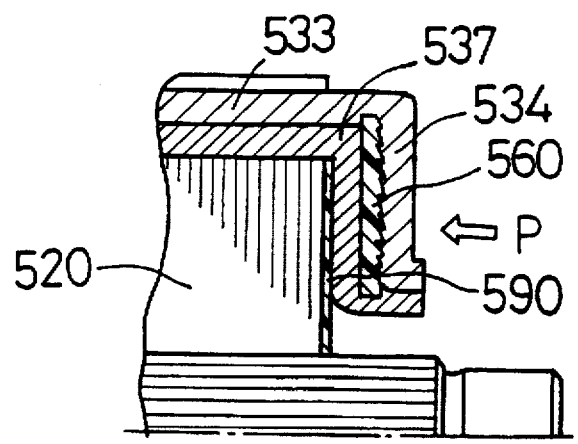
FIG. 22 is a cross-sectional side view illustrating the upper coil bar after the bending according to the variation of the fifth embodiment.

A variation of the fifth embodiment is shown in FIG. 21 and FIG. 22.

In this embodiment, the upper coil-end sections 534 have toothed surfaces on the portions in abutment with the insulating spacer 560 so as to increase the bonding strength of the upper coil-end sections and the insulating spacer 560, thereby preventing shifting of the upper coil-end sections 534 in the radial, circumferential and axial directions.

(Sixth Embodiment)

Figure 23:
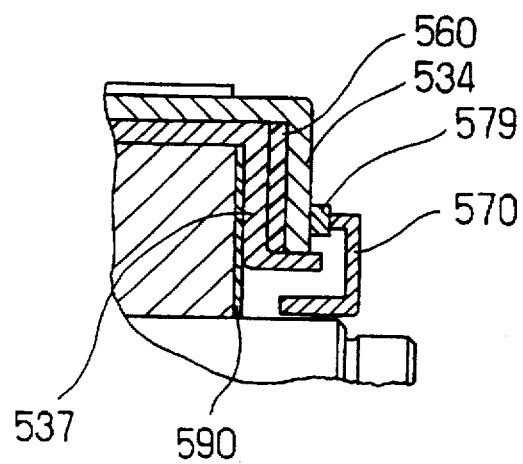
FIG. 23 is a cross-sectional side view illustrating a coil end portion of an armature according to a sixth embodiment.

A rotary electric machine according to a sixth embodiment of the present invention is described with reference to FIG. 23.

An elastic member 579 is disposed between the fixing cap 570 and the upper coil-end sections 534 in this embodiment. Since the elastic member biases the upper coil-end sections elastically, the thermal expansion of the upper and lower coil portions can be absorbed by the elastic member 579. The elastic member 579 can be formed separately or integrally.

(Seventh Embodiment)

Figure 24:
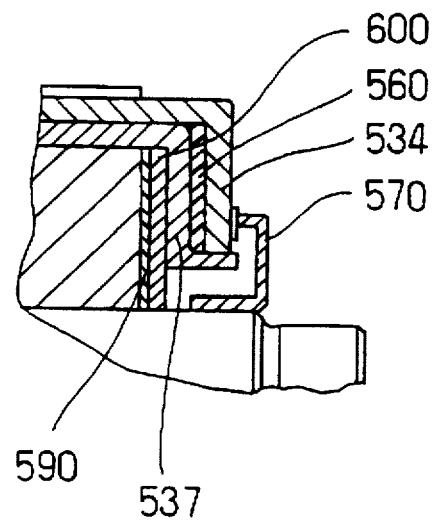
FIG. 24 is cross-sectional side view illustrating a coil end portion of an armature according to a seventh embodiment.

A rotary electric machine according to a seventh embodiment of the present invention is described with reference to FIG. 24.

An elastic spacer 600 is disposed between the lower coil-end sections 537 and the insulating ring 590. The insulating ring 590 and the elastic spacer 600 can be formed in a unit. The elastic ring 600 absorbs the thermal expansion effectively in this case. The elastic member 579 of the sixth embodiment can be also provided in this embodiment.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A rotary electric machine comprising:

a shaft;

an armature core connected to said shaft and having a plurality of slots on an outer periphery thereof;

a plurality of pairs of upper coil sections and lower coil sections, each pair of which is disposed in a corresponding one of said slots, each of said upper coil sections having an engagement portion including an axial face;

a plurality of lower coil-end sections, each having one end which is connected to an end of a corresponding end of said lower coil section and extends toward said shaft;

a plurality of upper coil-end sections, each of which is connected between an end of a said upper coil section and another end of a corresponding said lower coil-end section and extends toward said shaft to form a smooth contact surface;

a brush member disposed in contact with said contact surface; and restricting structure disposed between said lower coil-end sections and said upper coil-end sections to be in engagement with said engagement portion of said upper coil section, said restricting structure abutting said axial faces of said upper coil sections to restrict axial movement of said upper coil-end sections.

2. A rotary electric machine as claimed in claim 1, further comprising a cap fixed to said shaft for restricting said upper coil sections from moving beyond said contact surface and allowing said upper coil sections to expand thermally in a direction opposite said contact surface.

3. A rotary electric machine as claimed in claim 1, wherein said restricting means comprises an insulating member engaged with said upper coil-end sections at one end thereof.

4. A rotary electric machine as claimed in claim 3, wherein said insulating member comprises a member made of resinous material filling a volume between said upper coil-end sections and said lower coil-end sections.

5. A rotary electric machine comprising:

a shaft;

an armature core connected to said shaft and having a plurality of slots on an outer periphery thereof;

a plurality of pairs of upper coil sections and lower coil sections, each pair of which is disposed in a corresponding one of said slots;

a plurality of lower coil-end sections each having one end connected to an end of a corresponding said lower coil section and extends toward said shaft;

a plurality of upper coil-end sections each of which is connected between an end of a said upper coil section and another end of a corresponding said lower coil-end section and extends toward said shaft;

a brush member disposed in contact with contact surfaces composed of said upper coil-end sections; and means for restricting axial movement of said upper coil end sections;

wherein said restricting means comprises an insulating member engaged with said coil-end sections at one end thereof;

wherein said restricting means comprises a spacer disposed between said upper coil-end sections and said lower coil-end sections;

wherein each of said upper coil sections has a pair of recesses on both sides thereof and said spacer has a number of projections corresponding to a number of said upper coil sections so that each of said projections is fitted into a corresponding one of said recesses.

6. A rotary electric machine as claimed in claim 5, further comprising a member for elastically and externally biasing said upper coil-end sections toward said armature core.

7. A rotary electric machine as claimed in claim 6 wherein said biasing member comprises a fixing portion secured to said shaft, a biasing portion biasing said upper coil-end sections and an elastic portion connecting said fixing portion and said biasing portion.

8. A rotary electric machine as claimed in claim 6, wherein said biasing member comprises a biasing portion disposed at a side opposite said armature core to bias said upper coil-end sections and an elastic portion disposed between said biasing portion and said upper coil-end sections.

9. A rotary electric machine comprising:

a shaft;

an armature core connected to said shaft and having a plurality of slots on an outer periphery thereof;

a plurality of pairs of upper coil section and lower coil section each pair of which is disposed in a corresponding one of said slots, said upper coil sections having an engagement portion including an axial face;

a plurality of first lower coil-end sections, one end of each being connected to a corresponding one end of said lower coil sections and extending radially;

a plurality of first upper coil-end sections, each being connected between a corresponding one end of said upper coil sections and a corresponding other end of said first lower coil-end sections and extending radially to form a smooth contact surface;

a brush member disposed in contact with said contact surfaces composed of said first upper coil-end sections;

a plurality of second lower coil-end sections, one end of each being connected to a corresponding other end of said lower coil sections, and extending radially;

a plurality of second upper coil-end sections, each being connected between a corresponding other end of said upper coil sections and a corresponding other end of said lower coil-end sections, and extending radially; and restricting structure disposed between said first lower coil-end sections and said first upper coil-end sections in engagement with said engagement portion of said upper coil section, said restricting structure abutting said axial faces of said upper coil sections to restrict movement of said first upper coil-end sections.

10. A rotary electric machine as claimed in claim 9, wherein said restricting means comprises a spacer disposed between said second lower coil-end sections and said second upper coil-end sections.

11. A rotary electric machine for an engine starter motor, said machine comprising:

a shaft;

an armature core connected to said shaft and having a plurality of slots on an outer periphery thereof;

a brush member having a vertical contacting surface;

a plurality of stacked upper and lower coil bars, each of said lower coil bars disposed at a bottom of one of said slots, each of said upper coil bars disposed on a corresponding one of said lower coil bars and connected to another of said lower coil bars in another of said slots to form one turn coil, said upper coil bars having upper coil-end sections extending radially on an end of said armature core to form a radial commutating surface in contact with said brush member and each having a first engagement portion that includes an axial face;

first restrictors having second engagement portions in engagement with said first engagement portions, disposed between said upper coil bars and said lower coil bars, said second engagement portions abutting said axial faces to restrict axial movement of said upper and lower coil bars; and second means disposed between said shaft and said upper coil-end sections for restricting axial and radial movement of upper and lower coil bars.

12. A rotary electric machine as claimed in claim 11, wherein said second means comprises a member to allow said upper coil-end sections to expand thermally in a direction opposite said commutating surfaces.

13. A rotary electric machine as claimed in claim 11, wherein said first means comprises an insulating spacer.

14. A rotary electric machine as claimed in claim 11, wherein said second means comprises a member for elastically biasing said upper coil-end sections against said armature core from outside.

15. A rotary electric machine as claimed in claim 14, wherein said biasing member comprises a fixing portion secured to said shaft, a portion engaging with said upper coil-end sections and an elastic portion connecting said fixing portion and said engaging portion.

16. A rotary electric machine comprising:

a shaft;

an armature core connected to said shaft and having a plurality of slots on an outer periphery thereof;

a plurality of pairs of upper coil sections and lower coil sections, each pair being disposed in a corresponding one of said slots, each of said upper coil sections having a first engagement portion including an axial face;

a plurality of lower coil-end sections, one end of each being connected to a corresponding one end of said lower coil sections and extending toward said shaft;

a plurality of upper coil-end sections each of which is connected between a corresponding one end of said upper coil sections and a corresponding other end of said lower coil-end sections and extends toward said shaft to form a smooth contact surface;

a brush member disposed in contact with said contact surface; and an insulating spacer having second engagement portions and disposed between said lower coil-end sections and upper coil-end sections, said second engagement portions being in engagement with each other of said first engagement portions so as to abut said axial faces thereof, hereby keeping said contact surface smooth.

17. A rotary electric machine as claimed in claim 16, further comprising a member, fixed to said shaft, for restricting said upper coil-end sections in front of said contact surface and allowing it to move in the opposite direction.

18. A rotary electric machine as claimed in claim 16, wherein said first engagement portion comprises a portion having a pair of recesses on both sides thereof and said second engagement portion comprises a number of projections corresponding to a number of first engagement portions so that said projections are fitted into said recesses.

19. A rotary electric machine comprising:

a shaft;

an armature core connected to said shaft and having a plurality of slots on an outer periphery thereof;

a plurality of pairs of upper coil sections and lower coil sections, each pair being disposed in a corresponding one of said slots, each of said upper coil sections having a first engagement portion including an axial face;

a plurality of lower coil-end sections each having one end thereof connected to a corresponding one end of said lower coil sections and extending toward said shaft;

a plurality of upper coil-end sections each of which is connected between a corresponding one end of said upper coil sections and a corresponding other end of said lower coil-end sections and extends toward said shaft to form a smooth contact surface;

a brush member disposed in contact with said contact surface; and holding structure, disposed between said lower coil-end sections and upper coil-end sections and having second engagement portions in engagement with each of said first engagement portions so as to abut said axial faces thereof, to movably hold said lower coil section and said upper coil section in the axial direction while keeping said contact surface smooth.

20. A rotary electric machine as claimed in claim 19, further comprising a member fixed to said shaft for elastically and externally biasing said upper coil-end sections towards said armature core.

21. A rotary electric machine as claimed in claim 20, wherein said biasing member comprises a fixing portion secured to said shaft, a biasing portion biasing said upper coil-end sections and an elastic portion connecting said fixing portion and said biasing portion.

22. A rotary electric machine as claimed in claim 19, wherein said holding means comprises an insulating plate having said second engagement portions on the periphery thereof.

* * * * *